C. G. TURNER.
ICE CREAM CONE CUTTING MACHINE.
APPLICATION FILED SEPT. 14, 1920.

1,402,810.

Patented Jan. 10, 1922.
3 SHEETS—SHEET 1.

Inventor
C. G. TURNER
By W. J. Fitz Gerald & Co.
Attorney

C. G. TURNER.
ICE CREAM CONE CUTTING MACHINE.
APPLICATION FILED SEPT. 14, 1920.
1,402,810.
Patented Jan. 10, 1922.
3 SHEETS—SHEET 2.
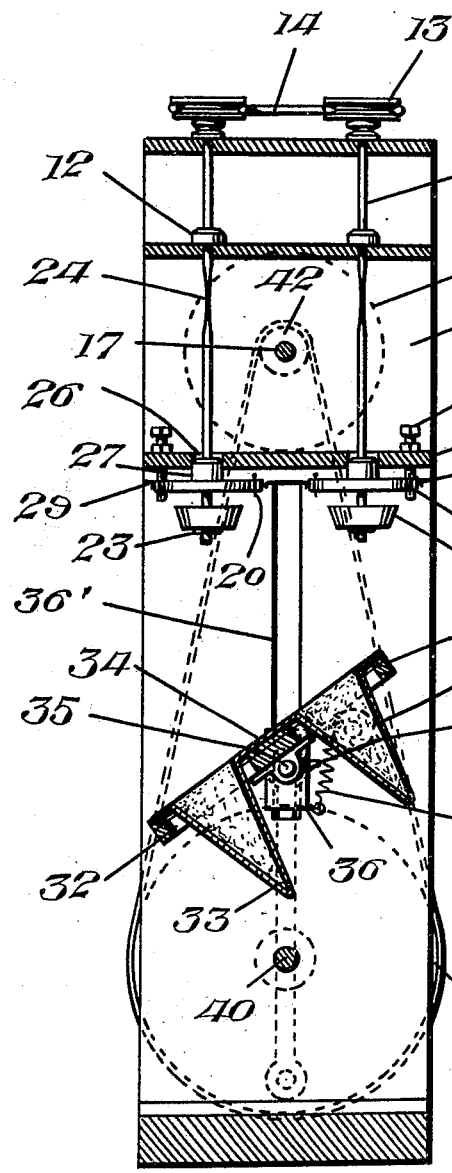
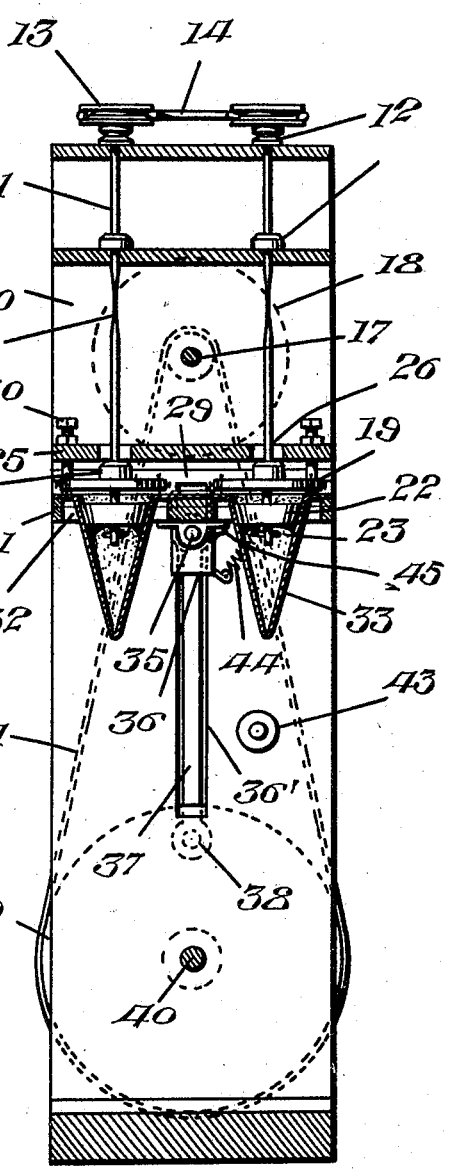
Inventor
C. G. TURNER
By W. J. Fitz Gerald & Co.
Attorney

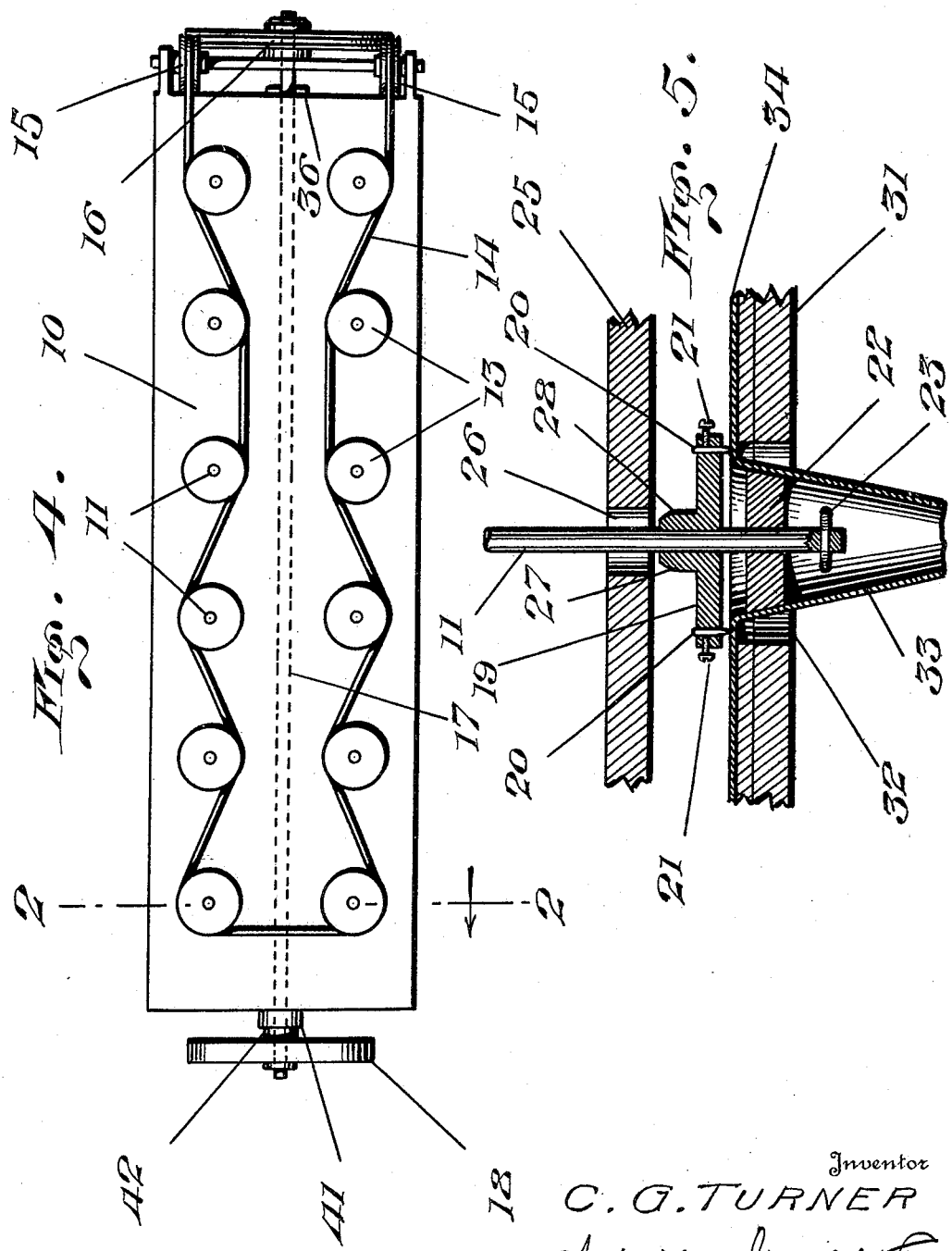

UNITED STATES PATENT OFFICE.

CHARLES GAINER TURNER, OF ATLANTA, GEORGIA.

ICE-CREAM-CONE-CUTTING MACHINE.

1,402,810.　　　　　Specification of Letters Patent.　　Patented Jan. 10, 1922.

Application filed September 14, 1920. Serial No. 410,200.

*To all whom it may concern:*

Be it known that I, CHARLES GAINER TURNER, a citizen of the United States, residing at Atlanta, in the county of Fulton and State of Georgia, have invented certain new and useful Improvements in Ice-Cream-Cone-Cutting Machines; and I do hereby declare the following to be a full, clear, and exact description of the invention, such as will enable others skilled in the art to which it appertains to make and use the same.

The present invention relates to a machine for cutting or trimming ice cream cones or similar articles, and aims to provide a novel and improved machine of that kind for cutting the cones or other articles from the web or sheet and trimming such cones or articles neatly and uniformly, in an expeditious and efficient manner, with a saving in time and labor.

One of the more specific objects of the invention is the provision of novel means for bringing together the cones and cutting or trimming means, for cutting the cones loose from the webs.

Another object is the provision of novel means for holding the cones and webs thereon, and carrying same for the operation of the cutting means, and also arranged for dumping the webs therefrom after the cones are cut loose.

A further object is the provision of a novel cutter or trimming head for cutting the web around the cone and providing a neatly trimmed annular flange or lip around the mouth of the cone.

A further object is the provision of means whereby the cutter heads are made to operate concentrically with respect to the cones, so that the lips or flanges of the cones are uniform, being of uniform width and diameter, and concentric with the cones.

A still further object is the provision of cutter heads which are shiftable transversely of their axes to be brought to positions concentric with the cones, and means for piloting the cutter heads to the cones in concentric position and shifting the cutter heads to such position when the cones and cutter heads are moved together.

The invention also has for its object the improvement of the construction and arrangement of parts to enhance the utility and efficiency of the invention.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Fig. 2 is a vertical transverse section taken on the line 2—2 of Fig. 4, showing the cone lift or elevator in the position as seen in Fig. 1.

Fig. 3 is a similar sectional view showing the cone lift or elevator raised and the cones in position for cutting.

Fig. 4 is a plan view of the machine.

Fig. 5 is an enlarged sectional detail through one cutter head and the adjacent parts, showing the cutter head in the act of cutting the web surrounding the cone.

Figure 1:
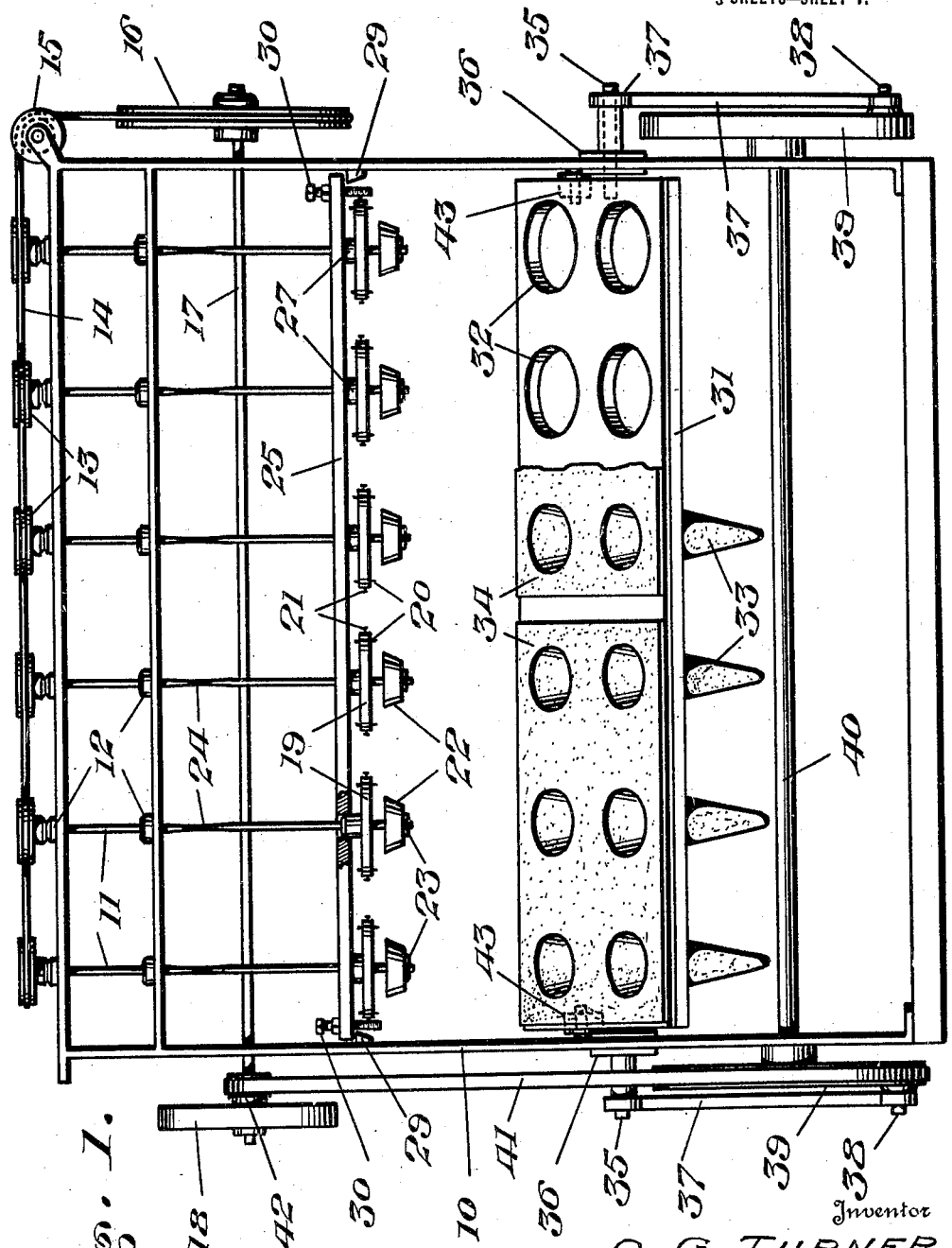
Figure 1 is a front view of the machine, showing the cone lift or elevator in cone-receiving position.

A suitable frame 10 for the machine is provided, in the upper portion of which a number of vertical shafts 11 are journaled in bearings 12 of the frame with said shafts depending below said bearings, and pulley wheels 13 are secured on the upper ends of the shafts and seat on the upper bearings for supporting said shafts. The shafts 11 can be in any suitable arrangement and of any suitable number, according to the cones to be cut, and are operated by a belt 14 trained around the pulley wheels 13, as seen in Fig. 4, and passing over idler pulley wheels 15 at one end of the top of the frame, and thence passing around and under the pulley wheel 16 secured on one end of a horizontal longitudinal shaft 17 journaled in the frame. A pulley wheel 18 is secured on the opposite end of the shaft 17 for belting the machine to a motor or engine, for driving the machine. The pulley wheel 16 is of larger diameter than the pulley wheels 13, so as to rotate the shafts 11 at a relatively high speed.

The cutter heads or disks 19 are secured on the shafts 11 near the lower ends thereof, and have cutter pins 20 engaged downwardly therethrough with lower pointed ends projecting below the cutter heads, and said cutter pins are secured in place by means of set screws 21 carried by the heads 19, or other suitable means. It has been found economical and convenient to use the needles of sound reproducing machines for the cutter pins 20. A centering pilot member or disk 22 is mounted for sliding and rotary movement on the lower terminal of each shaft 11 below the cutter head 19, and is supported by a cotter pin 23 or other retaining element engaged with the lower end of the shaft. The shafts 11 have flexible portions 24 underneath the bearings 12, whereby the lower terminals of said shafts can be bent or flex transversely to shift the heads 19 horizontally in various directions, and in order to retain the cutter heads in position concentric with the upper terminals of the shafts 11, when the cutter heads are rotating idly, a horizontal plate or member 25 is disposed within the frame above the cutter heads, and is movable vertically. Said plate 25 is provided with openings 26 through which the shafts 11 extend, and the cutter heads 19 have upstanding hubs 27 to fit snugly in said openings 26, whereby to retain the cutter heads in normal position. The upper ends of the hubs 27 are tapered, as at 28, to move readily into the openings 26, and thus bring the cutter heads into concentric relation with the upper terminals of the shafts 11. Thus, when the plate 25 is lowered to engage over the hubs 27 of the cutter heads, as seen in Fig. 1, then the cutter heads are maintained in a predetermined position for rotation, but when the plate is lifted off of the hubs 27, then the cutter heads are free to shift transversely with the shafts 11, said shafts being bendable and movable within the openings 26, as seen in Fig. 5. The side members of the frame 10 have flanges or seats 29 for supporting the ends of the plate 25 when it engages the hubs 27, and screws 30 are engaged through the end portions of the plate 25 for automatically raising the plate when the cones are brought to position for cutting, and said screws can be adjusted upwardly and downwardly to regulate the lifting of the plate 25.

The cone lift or elevator 31 comprises a suitable plate disposed for vertical movement within the frame underneath the cutter heads, and having openings 32 for the reception of the cones 33 which are united at their mouths or larger open ends by webs 34. As shown, six cones are united with each web, although the cones are baked or made in various units, and the machine can be constructed accordingly. The cones are inserted downwardly through the openings 32, so that the webs 34 seat on the lift 31. The openings 32 are of larger diameter than the cones for the convenient insertion of the cones in said openings, and to also permit of the operation of the cutter pins or points 20 within said openings around the mouths of the cones.

The lift 31 has trunnions 35 at its ends journaled within the slides 36 movable vertically in vertical slots 36' in the side members of the frame 10, whereby the lift is movable upwardly and downwardly toward and away from the cutter heads. The trunnions 35 are connected by connecting rods 37 with crank pins 38 carried by crank disks 39 secured on the ends of a horizontal longitudinal shaft 40 journaled in the frame below the lift, whereby the rotation of the shaft 40 will move the lift upwardly and downwardly automatically. One of the disks 39 provides a pulley wheel which is connected by a belt 41 with a smaller pulley wheel on the shaft 17, whereby to rotate the shaft 40 at a slower velocity, and thus raise and lower the lift at moderate speed for the insertion of the cones by the operator, whereas the cutter heads are rotated at a relatively high speed for cutting the webs 34.

The lift 31 can also tilt or swing laterally about the axis of the trunnions 35, for convenience in placing the cones thereon and for dumping the webs 34 after the cones are cut therefrom. Thus, rollers 43 or other suitable members are carried by the side portions of the frame 10 at one side of the trunnions 35, so that when the lift is lowered, one wing or side portion thereof will contact with and seat on the rollers or members 43, thereby stopping such wing, and the downward movement of the trunnions 35 below the horizontal plane of the rollers 43 will swing the opposite wing or edge of the lift downwardly, as seen in Fig. 2, thereby tilting the lift laterally, and bringing it to a position for the convenient placing of the cones in the lift by the operator, during the slight interval of rest in this position of the lift, while the crank pins 38 are at their lowermost positions, as seen in Figs. 1 and 2. Springs 44 connect the lift 31 and slides 36 for swinging the lift to horizontal position, when it is raised, and stops 45 are carried by the slides to limit the movement of the lift when swung to horizontal position by the springs.

In operation, when the lift 31 is moved downwardly, and brought to tilting position by contact with the rollers 43, the operator can conveniently place the webs 34 on the lift with the cones depending through the openings 32; the lift remaining for a sufficient interval in this position for the convenient placing of the cones. The upward movement of the connecting rods 37 will then raise the slides 36 and lift 31, and springs 44 will return the lift to horizontal position as it is raised, whereby to present the webs 34 of the cones to the cutter heads in parallel position. The mouths of the cones pass upwardly around the pilot members 22 first, and before the webs 34 reach the cutter pins or points 20, the lift 31 contacts with the screws 30 and raises the plate 25 off of the hubs 27 of the cutter heads, thereby releasing said cutter heads for horizontal shifting movement to different positions. The pilot members 22 settle within the cones as seen in Fig. 3, and the peripheries of said members 22 are preferably tapered so as to fit snugly within the cones. Therefore, if any of the cones are not concentric with the cutter heads which they approach, the respective pilot members 22 will be shifted laterally within the cones, inasmuch as the pilot members will settle or seat in the cones concentrically thereof, thereby bending the shafts 11 to bring the lower terminals thereof into the axes of the cones, and bringing the cutter heads concentric with the cones. The pilot members 22 are lifted with the cones as seen in Fig. 5, when the webs 34 are brought against the cutter pins or points 20, the shafts 11 moving downwardly through the pilot members 22. Then, the pins or points 20 in engaging the webs 34 will cut the same around the mouths of the cones concentrically with the cones, leaving an annular lip or flange surrounding the mouth of each cone which will be of uniform width and diameter. It has been found that the pins or points will cut the web without tearing, and leaving a neatly trimmed lip or flange on each cone. As soon as the web surrounding the cone is cut, the cone will drop by gravity and can be caught in any suitable receiver or receptacle. The cutter heads rotate continuously, so as to cut the webs as soon as said webs are lifted into contact with the cutter head pins or points, and when the lift is lowered, the plate 25 lowers with it, to move into engagement with the cutter head hubs 27, for returning said cutter heads to normal idle position, and the pilot members 22 also slide downwardly and seat on the retaining elements 23, as the cones drop from the lift. When the lift is at its lowermost position, and is tilted, the webs 34 are dumped off of the lift to one side thereof, so that the operator can place the next set of cones on the lift, in which event the operation is repeated. The only duty of the operator is to place the cones on the lift, and the cones are thus cut and trimmed quickly and efficiently with minimum time and labor. Furthermore, each cone is trimmed uniformly and neatly, due to the arrangement for centering the cutter heads with respect to the cones when the cones and cutter heads are brought together.

The machine can also be used for cutting other articles from webs or sheets of material.

Having thus described the invention, what is claimed as new is:—

1. In a machine of the character described, a cutter head, means for supporting a cone web, means for mounting said cutter head and means for movement to bring the web and cutter head together, and a pilot member to enter the cone in advance of said cutter head and position the cutter head and cone relatively for the cutting of the web around the cone by the cutter head.

2. In a machine of the character described, a depending shaft, a cutter head mounted on said shaft, a lift for supporting a cone web and for raising the cone to the cutter head, and a pilot member carried by the shaft below the cutter head to enter the cone and position the cone and cutter head relatively for the cutting of the web around the cone by said cutter head.

3. In a machine of the character described, a cutter head, a lift for a web or sheet, means for mounting said lift for movement upwardly to and downwardly from said cutter head and to dumping position when lowered, and means for raising and lowering said lift and moving it to dumping position.

4. In a machine of the character described, a cutter head, a lift for a web or sheet, means mounting said lift for movement upwardly to and downwardly from said cutter head and for tilting movement, and means for raising and lowering said lift and for tilting it when lowered to dump the web or sheet therefrom.

5. In a machine of the character described, a rotary cutter head, a lift under the cutter head for supporting a web or sheet, means mounting said lift for movement upwardly to and downwardly from said cutter head and for the tilting movement of the lift when lowered, means for raising and lowering the lift, and means for tilting the lift when lowered to dump the web or sheet therefrom.

6. In a machine of the character described, a cutter head, means movable upwardly and downwardly toward and away from said cutter head, a lift for a web or sheet movable with said means and swingable, means for swinging said lift to dumping position for dumping the web or sheet therefrom when the lift is lowered, and means for swinging said lift to position for the operation of the cutter head on the web or sheet when raised with the lift.

7. In a machine of the character described, a frame, rotary cutter heads mounted in the frame, slides mounted in the frame for upward and downward movement, a lift trunnioned to said slides to be moved upwardly to and downwardly away from the cutter heads and having openings under the cutter heads, means for raising and lowering said slides, means carried by the frame for the contact of the lift when lowered to tilt same to dumping position, and spring means between the lift and slides for returning the lift from tilted position when raised.

8. In a machine of the character described, a cutter head, means for supporting a cone web, means for mounting said cutter head and means for movement to bring the web and cutter head together and permitting the relative transverse shifting movement of said cutter head and the cone, and means for bringing the cutter head and cone into concentric position when they are brought together.

9. In a machine of the character described, a rotary cutter head, means for supporting a cone web with a cone extending therefrom, means mounting said cutter head and means for the movement of the web and cutter head into contact and permitting the relative transverse shifting movement of the cutter head and cone relatively to one another, and a pilot member carried with the cutter head to enter the cone and bring said cutter head and cone into concentric relation when they are brought together.

10. In a machine of the character described, a rotary cutter head, means for supporting a cone web with a cone extending therefrom, means for mounting said means and head for the movement of the cutter head and web into contact and including a shaft carrying said head, the second named means being arranged for the relative transverse adjustment of the cutter head and cone with respect to one another, and a pilot member mounted loosely on said shaft to enter the cone for bringing the cone and cutter head into concentric relation when they move together.

11. In a machine of the character described, a rotary cutter head, means mounting said cutter head for rotation and for transverse shifting movement to different positions, means for carrying a cone and its web to said cutter head for cutting the web around the cone, and means for piloting the cutter head into concentric relation with the cone when the cone is brought adjacent to the cutter head.

12. In a machine of the character described, a rotary cutter head, means supporting said head for rotation and for transverse shifting movement to different positions, means for carrying a cone and its web to the cutter head for cutting the web around the cone, and a pilot member mounted loosely adjacent to the cutter head and shiftable with said head, said pilot member being movable into the cone for bringing the cutter head concentric with the cone when the cone is brought adjacent to the cutter head.

13. In a machine of the character described, a flexible shaft, a cutter head carried by the shaft and shiftable laterally with the shaft to different positions, means for carrying a cone and its web to the cutter head for cutting the web around the cone, and pilot means carried by the shaft cooperable with the cone for bringing the shaft and cutter head concentric with the cone when the cone is moved adjacent to the cutter head.

14. In a machine of the character described, a rotary cutter head, means carrying said cutter head for rotary movement and for transverse shifting movement to different positions, and pilot means shiftable with the cutter head for entering a cone to shift the cutter head concentric with the cone.

15. In a machine of the character described, a flexible shaft, a cutter head carried by the shaft and shiftable transversely therewith to different positions, and a pilot member mounted loosely on the shaft for entering a cone to shift said shaft and cutter head into concentric relation with the cone.

16. In a machine of the character described, a depending flexible shaft, a cutter head carried by the shaft, means for elevating a cone and its web to the cutter head for cutting the web around the cone, and a pilot member mounted loosely on the shaft under the cutter head to enter the cone and shift the shaft and cutter head into concentric relation with the cone.

17. In a machine of the character described, a cutter head, means mounting the cutter head for rotation and for transverse shifting movement to different positions, means for supporting a cone and its web for the operation of the cutter head on the web around the cone, means for piloting the cutter head into concentric relation with the cone when the cone and cutter head are brought together, and means for preventing the transverse shifting movement of the cutter head and arranged to release the cutter head for transverse shifting movement when the cone and cutter head are brought together.

18. In a machine of the character described, a rotary cutter head, means for mounting the cutter head for rotation and for transverse shifting movement to different positions, means for carrying a cone and its web to bring the web against the cutter head for cutting the web around the cone, pilot means on one side of the cutter head to move into the cone for shifting the cutter head into concentric relation with the cone, when the cone is brought adjacent to the cutter head, and a member normally moved into engagement with the cutter head for preventing transverse shifting movement thereof and disengaged from the cutter head by the second named means when the cone is brought adjacent to the cutter head.

19. In a machine of the character described, a depending flexible shaft, a cutter head mounted on the shaft for transverse shifting movement with the shaft, a cone lift for raising a cone and its web adjacent to the cutter head for cutting the web around the cone, a pilot member on the shaft underneath the cutter head to enter the cone and shift the head into concentric relation with the cone, and a member movable vertically above the cutter head and movable downwardly into engagement with the cutter head for preventing transverse shifting movement thereof, the last named member being raised out of engagement with the cutter head when the lift is moved to a position adjacent to the cutter head.

20. In a machine of the character described, depending flexible shafts, cutter heads secured on said shafts having upstanding hubs, a lift movable upwardly and downwardly for carrying cone webs and their cones upwardly into engagement with the cutter heads for cutting the webs around the cones, pilot members on the shafts under the cutter heads to enter the cones and shift the cutter heads into concentric relation with the cones when the cones are brought adjacent to the cutter heads, and a plate above the cutter heads movable upwardly and downwardly and having openings to engage said hubs for holding the cutter heads against transverse shifting movement, said plate being raised when the lift is raised adjacent to the cutter heads.

In testimony whereof I have signed my name to this specification.

CHARLES GAINER TURNER.